Nov. 5, 1935. W. H. BASELT Re. 19,745
SLACK ADJUSTER
Original Filed Dec. 13, 1930
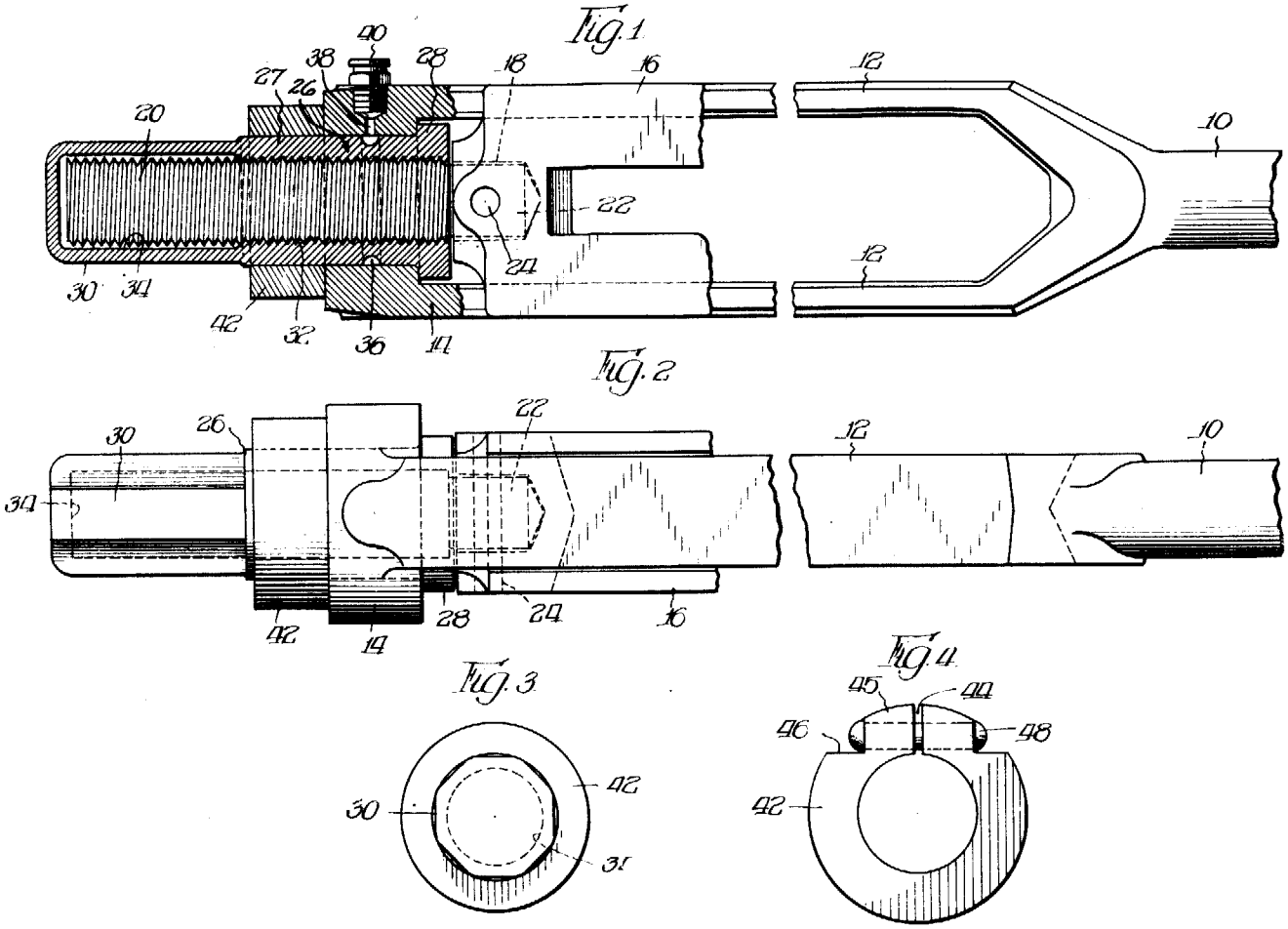
Inventor:
Walter H. Baselt,
By Wilkinson, Huxley, Byron & Knight
Attys Reissued Nov. 5, 1935

Re. 19,745

UNITED STATES PATENT OFFICE 19,745

SLACK ADJUSTER

Walter H. Baselt, Chicago, Ill., assignor to American Steel Foundries, Chicago, Ill., a corporation of New Jersey Original No. 1,947,444, dated February 20, 1934, Serial No. 502,051, December 13, 1930. Application for reissue June 18, 1934, Serial No. 731,156

5 Claims. (Cl. 188—197)

The invention relates to brake rigging and has reference more particularly to a slack adjuster for taking up the slack in railway brake rigging.

Slack adjusters of the type with which the present invention is principally concerned are generally manually operated screw mechanism for adjusting the connection between certain truck levers of the brake rigging, whereby the slack caused by the wear of the wheels and brake shoes and the wear and corresponding lengthening of the members of the brake rigging can be eliminated. To this end it is an object of the present invention to provide an improved slack adjuster of the above type employing relatively few parts, which will be efficient in operation and will fulfill all requirements of service and manufacture.

An object of the present invention is to provide an improved slack adjuster having novel means to adjust the relative position of the truck lever with which the same is associated, comprising a nut having integrally formed therewith housing means, thus eliminating the excessive number of parts heretofore employed in similar mechanisms.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a plan view, parts being shown in section, of the slack adjuster constructed in accordance with the present invention;

Figure 2 is a side elevational view of the same;

Figure 3 is an end view of the device shown in Figure 1; and

Figure 4 is a modified form of collar.

In the embodiment of the device selected for illustration in the drawing a tie rod 10 is disclosed, having a frame comprising a slotted end providing spaced arms 12, which are joined at the end opposite the tie rod by a hub 14. The fulcrum block 16 is adapted to have slidable movement upon the arms 12 and is provided with the centrally disposed socket 18. One of the truck levers of the brake rigging is adapted to have pivotal connection with the fulcrum block 16 and it is thus seen that movement of the block upon the arms 12 will function to vary the relative position of the truck lever with relation to the tie rod 10.

For effecting movement of the fulcrum block 16 an elongated screw 20 is provided having an inwardly projecting end 22 fitting into the socket 18 formed in the fulcrum block, and by means of the pin 24 the block and the screw are pivotally secured together. Rotatably mounted within the hub 14 is a nut 26 having a shoulder or an enlarged end 28 engaging the inner surface of the hub and being provided with an extension having a seating portion 27 and a plurality of flat surfaces 30 whereby the same may be easily gripped by any suitable tool for imparting rotation to the nut. The nut 26 is provided with a centrally disposed bore having a portion of the same threaded, as shown at 32, and the remaining portion located in the extension hollowed out to form a cavity 34 of a diameter slightly larger than that of the screw 20. A groove 36 is formed upon the periphery of the nut 26 adjacent the enlarged end 28 and disposed in alignment with the groove is a duct or passage 38 in the hub 14, terminating in an enlarged screw threaded aperture for accommodating the fitting 40. Since the nut 26 is adapted to have rotation within the hub 14 lubrication of the surfaces can therefore be easily taken care of by forcing any suitable lubricant by means of the alemite fitting 40 through the passage 38 to the groove 36 where it will work its way between the surfaces of the members.

For preventing endwise movement of the nut 26 a collar 42 is suitably secured on the seating portion 27 of the extension, the collar engaging the outside surface of the hub 14 and thus in connection with the enlarged end 28 serves to hold the nut in position in the hub 14 against any tension exerted by the fulcrum block 16. The collar 42 may be shrunk on the seat 27 as in Figure 1, or may take the form of the collar shown in Figure 4, wherein the same is split as at 44 to form spaced ends 45, the same being provided with the cut-away shoulders 46 for accommodating the rivet 48. With respect to nut 26 it will be noted that the extremity of the extension, that is, the portion provided with the flat surfaces 30, is of smaller diameter than the remainder of the nut. The structure makes for greater ease in telescoping the collar over the extension when shrink fitting the same on the seating portion.

In operation of the slack adjuster the tie rod 10 may comprise any tie rod of the brake rigging having connection to the truck levers and connection to the same in this case is effected by pivotally joining the truck lever to the fulcrum block 16. Movement of the fulcrum block, therefore, upon the arms 12, will function to vary the relative position which the lever will assume in relation to the tie rod. For adjusting the position of the fulcrum block it is only necessary to cause rotation of the rotatable nut 26 which will function to cause movement of the screw 20 through the threaded engagement the nut has with the screw. This movement of the screw will thus impart corresponding movements to the fulcrum block to take up the necessary slack in the brake rigging. In order that the nut 26 may be readily turned when desired its projecting end or extension is provided with flat surfaces 30 forming means whereby the same can be readily gripped by any suitable tool. The nut 26, in addition to having a threaded bore for cooperation with the threaded screw 20, is provided with the extension having the cavity 34 which forms a housing for accommodating the projecting end of the screw. Since the nut 26, by reason of its construction, provides both a housing for the projecting end of the screw, as well as the operating means for the screw, it eliminates a number of parts heretofore employed in slack adjusters for performing these operations, and further has the advantage that the housing is integral with the body portion of the nut and therefore it is impossible for the parts to become loose.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake slack adjuster, the combination of a frame, a fulcrum block slidably mounted in the frame, a screw secured to the block and extending through an aperture in the frame, a nut rotatably mounted in said aperture and having threaded engagement with the screw, said nut having a hollow extension integral therewith for enclosing the end of the screw, and a collar secured to the exterior of the extension and engaging said frame for preventing longitudinal movement of the nut, the portion of the extension seating the collar being greater in diameter than the remainder of the extension.

2. In a brake slack adjuster, the combination of a frame, a fulcrum block slidably mounted in the frame, a screw secured to the block and extending through an aperture in the frame to project beyond said frame, a nut rotatably mounted in said aperture and having threaded engagement with said screw, said nut being provided with a hollow extension integral therewith, said extension forming a housing for enclosing the projecting end of the screw and having a seating portion on the exterior thereof, and a collar mounted on said seating portion for preventing axial movement of the nut with respect to the frame, said seating portion having the same diameter as that portion of the nut mounted in said aperture.

3. In a brake slack adjuster, a frame providing spaced arms joined at one end by a hub portion and connecting at their other end with brake rigging, a fulcrum block slidably mounted in the spaced arms, a screw secured to the block, an opening extending through the hub portion longitudinally of the spaced arms, a nut rotatably mounted for rotation in the opening and having threaded engagement with said screw whereby rotation of the nut causes longitudinal movement of the screw and fulcrum block connecting therewith, said screw extending beyond the frame and said nut having a hollow extension integral therewith for enclosing the projecting end of the screw, a seating portion on the exterior of said extension, said seating portion being a continuation of the nut and having the same diameter as the nut, and means preventing longitudinal movement of the nut including a flange integral therewith engaging one side of the hub portion and a shrunk collar on said seating portion engaging the other side of the hub portion.

4. In a brake slack adjuster, the combination of a frame, a fulcrum block slidably mounted in the frame, a screw secured to the block and extending through an aperture in the frame, a nut rotatably mounted in said aperture and having threaded engagement with the screw, said nut having a hollow extension integral therewith and surrounding the side and end surfaces of the screw for completely enclosing the end of the screw, and a collar secured to the exterior of the extension and engaging said frame for preventing longitudinal movement of the nut.

5. In a brake slack adjuster, the combination of a jaw having a hub, a fulcrum block slidably mounted in said jaw, a nut rotatably mounted in said jaw, a screw secured to the block and in threaded engagement with said nut, said nut projecting through the hub of said jaw and being secured therein by a thrust shoulder engaging the inside of said hub and a shrink collar engaging the outside of said hub, said nut having a housing integral therewith for surrounding the side and end surfaces of the screw for completely enclosing the end of said screw.

WALTER H. BASELT.